Figure 1:
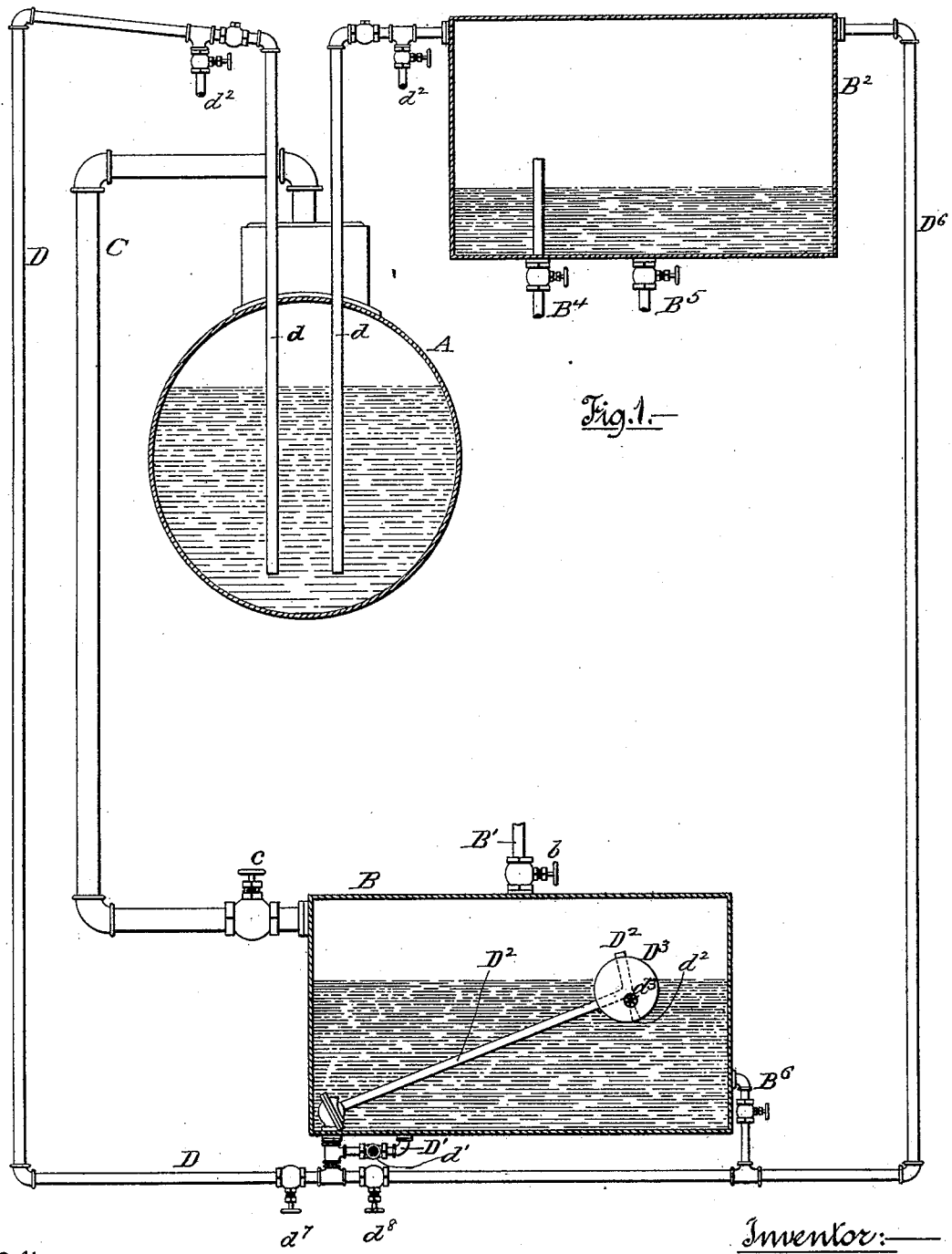

(No Model.) 2 Sheets—Sheet 2.
W. BURNHAM.
APPARATUS FOR RAISING WATER BY STEAM.
No. 394,826. Patented Dec. 18, 1888.
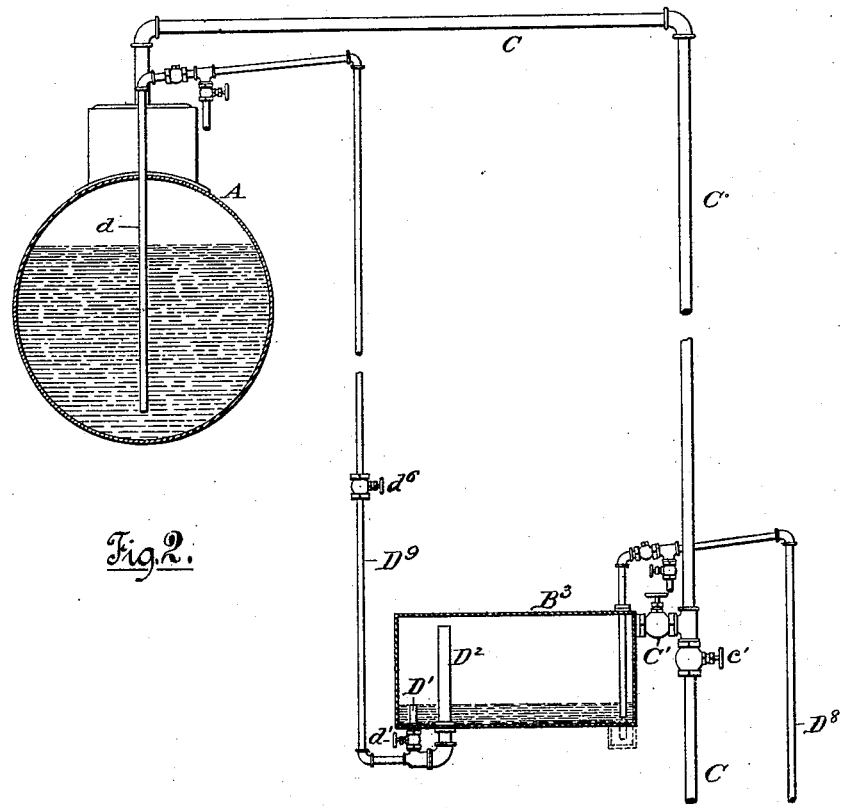
Fig. 2.
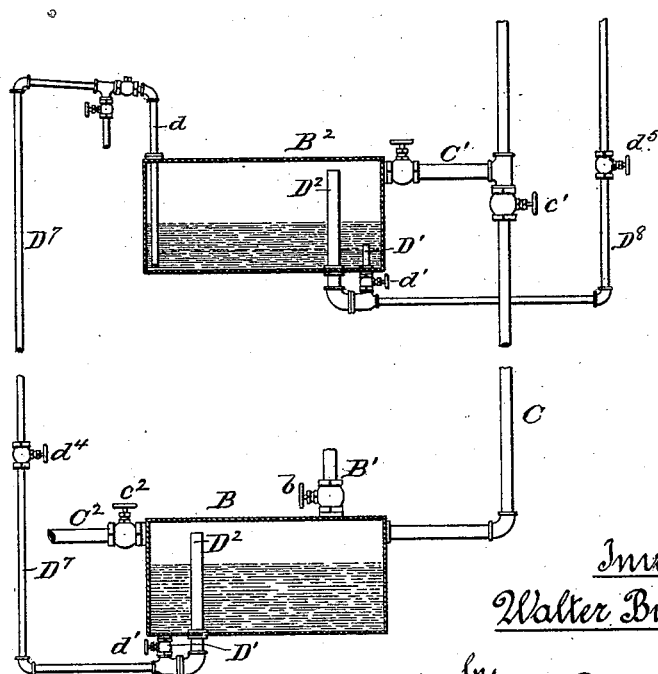
Witnesses:
Wm. J. Henning
Louis M. F. Whitehead
Inventor:
Walter Burnham
by Dayton, Pool & Brown
Attorneys.

UNITED STATES PATENT OFFICE.

WALTER BURNHAM, OF CHICAGO, ILLINOIS.

APPARATUS FOR RAISING WATER BY STEAM.

SPECIFICATION forming part of Letters Patent No. 394,826, dated December 18, 1888.

Application filed February 21, 1888. Serial No. 264,810. (No model.)

*To all whom it may concern:*

Be it known that I, WALTER BURNHAM, of Chicago, in the county of Cook and State of Illinois, have invented certain new and useful Improvements in Apparatus for Raising Water and other Liquids and Substances by Steam; and I do hereby declare that the following is a full, clear, and exact description thereof, reference being had to the accompanying drawings, and to the letters of reference marked thereon, which form a part of this specification.

This invention relates to improvements in an adaptation of the steam apparatus described in an application for patent made by William Irving, of Chicago, Illinois, filed February 7, 1888, Serial No. 263,225, in which said Irving provides for the lifting of water of condensation and entrainment from a steam-pipe and its return to the generator by the direct agency of steam.

The objects of the present improvements are to apply the principle of the Irving invention to the raising of liquids and substances other than water of condensation or entrainment, either for its delivery into a steam-generator, as in the case of feed-water, or for its delivery exterior to the generator, as in the case of the use of the apparatus for pumping water, oil, or other liquids or solids in small particles, such as sand.

The accompanying drawings illustrate the invention in apparatus designed to raise liquids.

In Figure 1 are shown two separate or separable apparatuses in connection with a single steam-generator, and in Fig. 2 is shown an apparatus for raising water by successive stages to a great height.

Fig. 1 is a vertical transverse section of a steam-generator, a similar section of a vessel to which external water or other fluid may be supplied and from which it is to be raised, a similar section of an elevated tank into which water or other fluid from the lower tank is to be delivered when not sent to the generator, a steam-pipe in elevation leading from the generator to the tank from which water is to be raised, a pipe leading from said tank to the water-space of the generator, a pipe leading also from the lower to the elevated tank, a pipe leading from the latter tank to the water-space of the generator, and various adjuncts and connections, all in elevation. Fig. 2 shows a generator in transverse vertical section, a series of tanks at different elevations, also in vertical section, a steam-supply pipe in elevation connecting the steam-space of the generator with each of the several tanks, and lifting-pipes severally connecting each of the several tanks with the one above it and the last of said tanks with the water-space of the generator, together with various adjunctive devices and connections.

Referring first to Fig. 1, A represents a steam-generator; B, a tank or reservoir from which water is to be raised either to the generator or other elevated receptacle; C, a steam-pipe leading from the generator to the upper part of the reservoir B, and D a pipe communicating with the lower part of the reservoir B, and also with the water-space of the generator. B' is a pipe provided with a valve, $b$, by which water may be introduced into the reservoir B for the purpose of being fed through the pipe D into the generator A.

Limiting the description, for the present, to the elements just pointed out, and recurring to the specification of William Irving, hereinbefore referred to, it will be remembered that if only the water of condensation and entrainment from the steam-pipe C be admitted to a chamber, B, and if the pipe D be connected with the bottom of the chamber B, there will be a rapid flow of steam from the chamber B upwardly through the pipe D to a low-pressure space above the water in the leg $d$ of said pipe D, and that in such upward rush of the steam through D the water of condensation and entrainment will be carried in small masses along with the steam and deposited in the leg $d$, whence it will ultimately find its way in the water-space of the generator. I have found that such upflow of steam may be made to carry more water than that condensed in or entrained with the steam from the generator into the pipe C, and that an apparatus working on the principle of said Irving device may be made to feed the boiler with whatever water it may require in addition to the entrained and condensed water, which is returned thereto. More generally speaking, I have discovered that the Irving principle may be applied successfully to the pumping or raising of liquids other than or in addition to such water of condensation and entrainment as may form or enter the steam-supply pipe.

In the operation of the Irving system, as described by him in the before-mentioned specification, a too large body of water in the enlargement of the steam-pipe, which he terms the "separator," (and which, in a sense, answers to the chamber or reservoir B of the present drawings,) will prevent the inauguration of that movement of steam by which the water may be lifted. I provide means by which such a body of water—as, for example, that shown by dotted lines in the chamber B of Fig. 1—may be taken into the return-pipe in a restricted stream, and steam at the same time admitted to said return-pipe in sufficient quantity to raise the water as fast as admitted, and thus obviate the necessity of emptying said chamber B as a preliminary to the inauguration of the lifting operation desired. That form of the device for this purpose which is shown in Fig. 1 consists of a pipe, D', provided with a valve, d', and leading from the bottom of the tank B into the pipe D, for the regulated outflow of the water, and a jointed steam-pipe, D², provided with a float, D³, at its free end, which sustains its open mouth above the water-level, and which communicates at its opposite end with the pipes D' and D. By closing the valve d' sufficiently to limit the outflow of water through the pipe D' to a quantity which may be raised by the steam admitted to the pipe D through the pipe D² it becomes manifestly immaterial what bulk or quantity of water may be present in the chamber B, and any quantity of water may be at any time admitted to said chamber through the pipe B'. From this chamber B, therefore, the generator may be wholly supplied, no matter what quantity of its water may go to waste from the exhaust of an engine or other steam-using device deriving its supply from the generator.

In connection with the float D³, for sustaining the free end of the jointed pipe D², I have shown as a substitute for the water-pipe D' an orifice, d², in the bottom of the float and leading into the pipe D², said orifice being controlled by a valve, d³, if not originally made small enough to of itself properly limit the inflow of water to said pipe D². In Fig. 2 of the drawings I have shown still another construction—as, for example, in the tank B at the bottom of said figure, wherein the pipe D², instead of being jointed and sustained at its free end by a float, is rigid and extends to near the top of the chamber B.

Not only may water sufficient to supply the waste from the generator be raised by the Irving apparatus, but water or other fluid or fluids carrying solids, or even solids themselves, if like sand, may be lifted and delivered into a receptacle other than the generator. For this purpose I have devised the construction shown at the right of Fig. 1, wherein a tank, B², is connected at its upper portion into the return-pipe D⁶, which answers to the return-pipe D at the left of said figure. In this construction water and steam, being delivered into the pipe D⁶ through D' (or d²) and D², respectively, both rise through D⁶ and enter the tank B², where the water (in operating with that fluid) is deposited and the steam, or a greater portion thereof, condenses, giving an increased activity to the lifting action of the device proportioned to the greater heat radiation or condensing action of the tank B². Some portion of the steam will, however, pass on into the leg d, and will be condensed above the water therein, and the water of such condensation in the leg will enter the generator.

An apparatus provided with a tank or chamber, D², in substantially the position shown in Fig. 1, and constructed favorably to the radiation of heat therefrom and consequent condensation of steam therein, or having its pipe-connection d provided with a valved escape, d², may be made to serve as a very efficient pumping or fluid-lifting device, and, so far as can be determined from experiments already made, there seems to be no narrow limit to the height to which water can be so lifted. If enough steam be passed through the lifting-pipe D⁶ to carry the water in the form of spray wholly rather than in the form of pistons or slugs, transversely filling the pipe D⁶, the law of balance as between the water ascending with the steam in said lifting-pipe and that of the mass or column in the leg d seems to be to this extent abrogated. In other words, it appears that such quantity of water as is carried upward by the steam in spray or vapor does not perceptibly weigh as against the water column in the leg d, and may, therefore, exist to any extent in the ascending steam, and may rise to any height therewith without affecting, or at least defeating, the operation of the apparatus. The aggregate mass of water carried up by the steam in detached masses which do transversely fill the lifting-pipe D or D⁶ does, however, weigh against the column in the water-leg, and to provide for the lifting of water in such large masses to great heights by application of the Irving principle I have devised the construction shown in Fig. 2. In this figure is shown a succession of tanks, B, B², and B³, one above the other, with means for either first lifting water from the lowest tank to the next higher and thereafter from that to the next higher still, or under proper conditions of steam-supply for lifting from all of the tanks to the next higher at the same time. In this Fig. 2 the broken pipe C is a steam-supply pipe leading from the generator to the lowest tank, B, of a series of tanks, which may comprise any number according to the distance to which water is to be raised. From said pipe C leads the valved pipe C' to each one of the more elevated tanks B² B³, &c. Below the branches C' is located in the pipe C a valve, c', which enables the steam-supply to be cut off from the tank or tanks located below either of said valves. The return-pipe or lifting-pipe ($D^7$ $D^8$ $D^9$, &c.) answering to D or $D^6$ of Fig. 1 extends in Fig. 2 from each of the said tanks to the next one above it, the upper one of said return-pipes being shown as terminating in a leg, $d$, which passes below the water-line of the generator. Said return-pipes are marked in Fig. 2 respectively $D^7$, $D^8$, and $D^9$, and said pipes are respectively provided with stop-valves $d^4$ $d^5$ $d^6$ in addition to the check and escape valves located in the upper part of said lifting-pipes, which are the same as shown in the said Irving specification. The water-lifting pipes which enter the tanks $B^3$ and $B^3$ terminate below the water-line of said tanks as the leg $d$ terminates below the water-line of the generator, and a water-line is given in said tanks $B^2$ $B^3$ by the upward prolongation of the water-discharge pipes $D'$.

The apparatus shown in Fig. 2 may be employed to raise only the water of condensation and entrainment from the steam-pipe C—as, for example, when said pipe is prolonged beyond the chamber B by the pipe $C^2$, leading to an engine or other steam-using device—or it may be employed to raise water other than or in addition to such water of condensation and entrainment. When the latter purpose is had in view, the tank B will be provided with a valved inlet, $B'$, for the supply of water thereto. In the use of this apparatus for raising water successively from a lower tank to a higher one, or from the lowest to the next higher, then from the second to the next higher still, and so on, the operation will be as follows: Close the valve in the pipe $C'$ leading to the tank $B^3$ and open that leading to the tank $B^2$, both the valves $c'$ being open; also open the valve $d^4$ in $D^7$ and partially open the valve $d'$ in the water-discharge pipe $D'$, leading from the bottom of the lowermost tank, B. Both of the tanks B and $B^2$ will in this case be subject to steam-pressure from the pipe C. A limited quantity of water will pass through $D'$ into $D^7$ and will be carried upward through $D^7$ into the descending leg $d$ of $D^7$ and ultimately into the tank $B^2$ by the action of the steam which passes from the tank B through $D^2$ into said lifting-pipe $D^7$. The water having been exhausted from B into $B^2$, to raise the same from the tank $B^2$ to the tank $B^3$ only close the valve $c'$ below the branch $C'$, which leads to the tank $B^2$, and open the valve in the steam branch $C'$, leading to $B^3$; also open $d^5$, and, finally, open slightly the valve $d'$ in the pipe $D'$, leading to the pipe $D^8$. The valves $d^6$ and $d'$ of the lifting-pipe $D^9$, leading from $B^3$, are supposed to be closed. The operation of the steam to lift the water through the lifting-pipe $D^8$ is like that already pointed out in connection with the pipe $D^7$. Finally, to operate the uppermost system or circuit alone, close the valve $c'$ next below the steam branch $C'$, leading to $B^3$, and open first $d^6$ and then $d'$ of the upper system.

If it is desired to operate all of the systems or series of lifting devices at the same time, all the tanks are put under steam-pressure and the several valves in the lifting-pipes $D^7$, $D^8$, and $D^9$ are opened, as already described—that is to say, $d^4$, $d^5$, and $d^6$ are fully opened, and $d'$ of each lifting-pipe is opened only so far as will permit such a quantity of water to pass as may be raised by the steam through the adjacent pipe $D^2$.

Returning to Fig. 1, the tank $B^2$ is shown provided with two discharge-pipes, $B^4$ and $B^5$, provided with cocks or valves, the former leading from a higher point in the tank than the latter. The tank B is also shown as having a valved pipe, $B^6$, leading from a somewhat elevated point of the tank into the lifting-pipe $D^6$. Suppose that oil or other liquid lighter than water be introduced into the tank B and to extend from a point below to a point above $B^6$. The pipe $B^6$ may be opened instead of $D'$, or both may be opened to a less extent than either would be opened alone, and the oil or the oil and water will be raised and delivered into the tank $B^2$. By means of the pipes $B^4$ and $B^5$, reaching to unequal heights in the tank $B^2$, the water and the oil may be separately withdrawn. The valves $d^7$ $d^8$ are manifestly for the sole purpose of cutting off D or $D^6$ when both have a single connection with a tank, B.

Not only liquids, but sand and similar substances, may be raised by the method and apparatus described.

In other applications for patent filed by me of even date herewith I have pointed out that other forms and arrangements of water column in the return or water-lifting pipe may be used, and in one other application have shown an obstacle of a purely mechanical character to take the place of a water column. In one instance I have shown the water-lifting pipe as having no connection with the generator, and as being provided with a water column adapted to resist the pressure from the generator within the condensing-chamber, the water of condensation and entrainment being from time to time added to such resisting column at one end thereof, while at the other end it overflows into an elevated receptacle other than the generator. I desire it to be understood that any of these various forms of obstacle may be employed in the various forms of apparatus shown herewith instead of employing the connection of the water-lifting pipe with the generator, as here shown.

In other applications I have also shown a valved pipe leading from the bottom of a separator or other chamber to a return or water-lifting pipe, and a second pipe leading from the steam-space of such separator or chamber into the return-pipe, whereby the outflow of water may be controlled and a preliminary abstraction of the entire body of water from the separator or chamber avoided as a prerequisite to starting the lifting element of the apparatus. Such construction is not, therefore, herein broadly claimed.

I claim as my invention—

1. The combination, with a steam-supply pipe, of a chamber or tank provided with means for the introduction of water or other fluid or substance, a more elevated chamber or tank provided with means for withdrawing its contents, and a pipe provided with branches connected, respectively, with the upper and lower parts of the lower chamber and delivering into the upper part of the upper chamber.

2. The combination, with a steam-supply pipe, of a chamber provided with means for introducing water or other liquid or substance, a more elevated chamber provided with means for withdrawing its contents, and a pipe leading to the upper part of the upper chamber, which pipe is provided with two branches, one of which communicates with the steam-space and the other of which, having a regulating-valve therein, communicates with the lower part or water-space of said lower chamber.

3. The combination, with a steam-supply pipe, of a chamber provided with means for introducing water or other liquid or substance, a more elevated chamber provided with a plurality of valved discharge-passages located at different elevations, and a pipe connected with the lower chamber by three passages which open at different elevations in said chamber.

4. The combination of a steam-generator, a chamber provided with means for introducing water, a steam-supply pipe leading from the generator into said chamber, a more elevated chamber provided with means for withdrawing its contents, a pipe having connection by separate branches with both steam and water spaces of the lower chamber and delivering into the upper part of the more elevated chamber, and a pipe leading from the steam-space of said upper chamber into the generator and having a descending part high enough to contain a water column due to the difference between the pressures above and below it.

5. The combination, with a steam-generator, of two or more tanks located at different elevations below the water-level of the generator, the lowermost of said tanks being provided with means for admitting water thereto, a steam-supply pipe leading from the generator to each of said tanks, pipes severally connecting both the water-space and the steam-space of each tank with the tank above it, (the highest tank being thus connected with the generator,) and each of said last-mentioned connecting-pipes having a part which rises above the water-level of the tank or generator, into which it delivers, and a succeeding descent containing a water column of height due to the difference in the pressures above and below it, substantially as described.

In testimony that I claim the foregoing as my invention I affix my signature in presence of two witnesses.

WALTER BURNHAM.

Witnesses:
M. E. DAYTON,
TAYLOR E. BROWN.